United States Patent [19]
Podhajecki et al.

[11] Patent Number: 5,660,485
[45] Date of Patent: Aug. 26, 1997

[54] MODULAR RETAINER ASSEMBLY

[75] Inventors: Stephen T. Podhajecki, Norfolk; John H. Rhodes, Torrington; Walter P. Waskiewicz, Bristol, all of Conn.

[73] Assignee: The Torrington Company, Torrington, Conn.

[21] Appl. No.: 667,104

[22] Filed: Jun. 20, 1996

[51] Int. Cl.[6] ................................................ F16C 33/46
[52] U.S. Cl. .......................................................... 384/572
[58] Field of Search ................................ 384/572–580

[56] References Cited

U.S. PATENT DOCUMENTS 1,169,469  1/1916  Dunning .
1,577,787  9/1926  Christopherson .
1,601,104  11/1926  Bower .
2,677,449  2/1954  Wavak .
3,400,991  9/1968  Haller .

*Primary Examiner*—Lenard A. Footland
*Attorney, Agent, or Firm*—John C. Bigler

[57] ABSTRACT

A plurality of wedge-shaped separator elements are pivotably mounted on a retainer ring such that the separator elements may space rollers of a roller bearing circumferentially. The separator elements include a narrow portion for engagement with a thrust flange of one of the inner and outer bearing rings to restrain the bearing retainer in the axially outward direction and include a wide portion for engagement with the rollers to retain the rollers in one of the radially outward and radially inward directions. The retainer ring engages the rollers to retain the bearing retainer in the axially inward direction.

16 Claims, 5 Drawing Sheets

MODULAR RETAINER ASSEMBLY

BACKGROUND OF THE INVENTION

This invention relates generally to bearing retainers and, more particularly, to a modular bearing retainer suitable for retaining rollers within large diameter roller bearings.

In conventional large roller bearings, the rollers are typically retained by bearing retainers that are machined out of large diameter, heavy wall, non-ferrous tubing, resulting in high material and processing costs. Additionally, such bearing retainers must be unique for any combination of roller diameter, length, pitch and pitch diameter, and must be machined accordingly. In many cases, the resulting machined bearing retainer may restrict lubricant flow and may have a heavy mass that can lead to failure from reversing loads, in particular applications.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a bearing retainer to be positioned between an inner bearing ring and outer bearing ring of a roller bearing such that the retainer ring engages first ends of the rollers to retain the bearing retainer in the axially inward direction. A plurality of wedge-shaped separator elements are pivotably mounted on the retainer ring such that the separator elements space the rollers circumferentially. The separator elements include a narrow portion for engagement with a thrust flange of one of the inner and outer bearing rings to restrain the bearing retainer in the axially outward direction and include a wide portion for engagement with the rollers to retain the rollers in one of the radially outward and radially inward directions.

In another aspect of the invention, this is accomplished by providing a roller bearing including a retainer ring.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
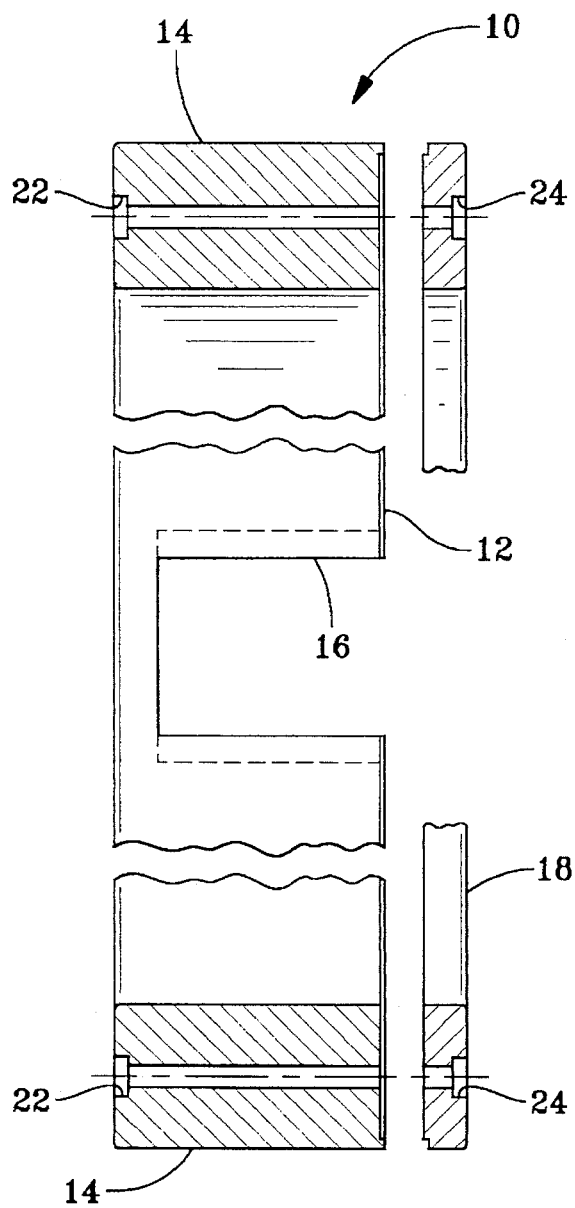
FIG. 1 is an exploded cross-sectional view of a conventional bearing retainer according to the prior art.
Figure 2:
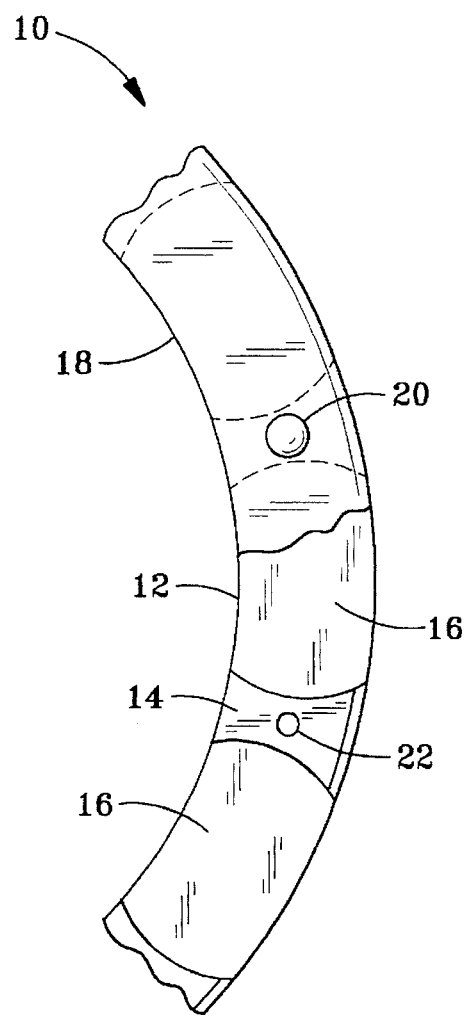
FIG. 2 is an end view of a portion of the conventional bearing retainer of FIG. 1, with portions cut away.

Referring now to the drawings, FIGS. 1 and 2 illustrate a conventional bearing retainer 10 machined from brass or bronze for use with a roller bearing. Retainer body 12 has separator portions 14 forming roller pockets 16. Retainer end plate 18 is riveted to retainer body 12 by recessed rivets 20 (not shown in FIG. 1) through counterbored holes 22 and 24 after insertion of the rollers, not shown.

Figure 3:
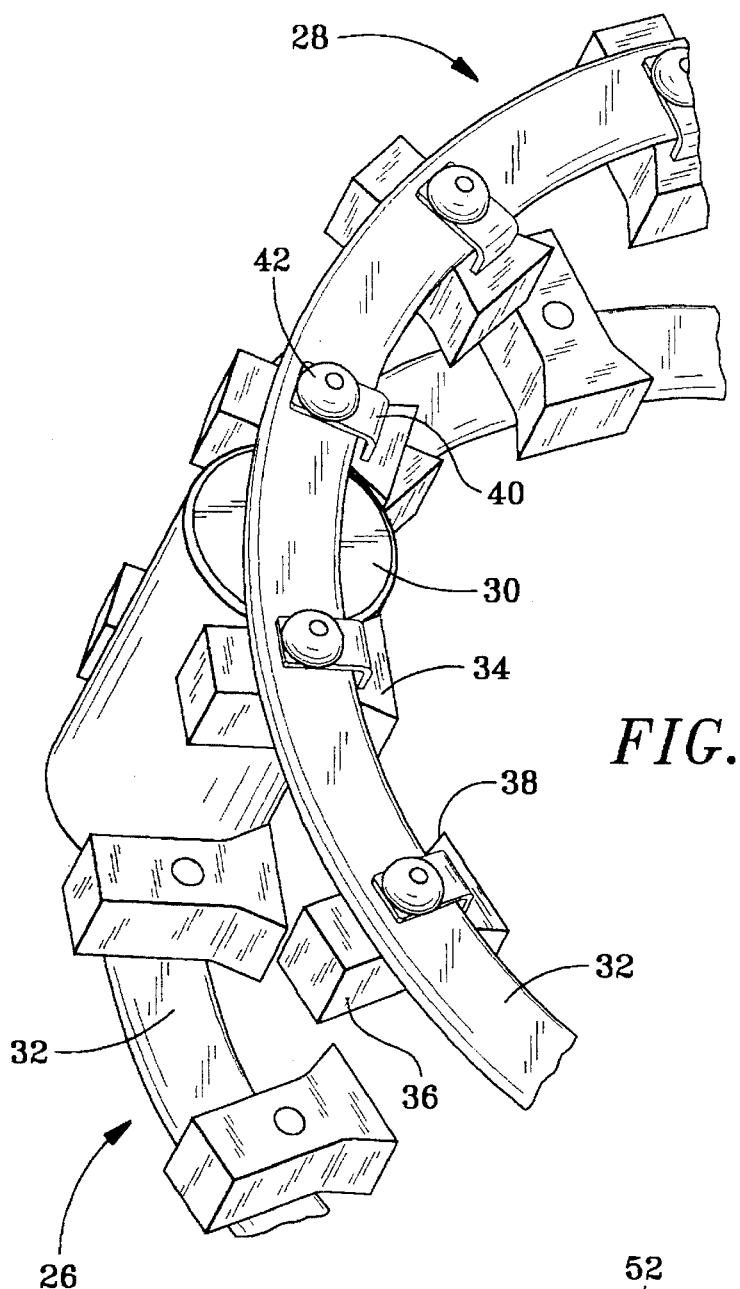
FIG. 3 is a pictorial view of portions of two bearing retainers according to the present invention in combination with a roller.

FIG. 3 illustrates portions of two bearing retainers 26 and 28 according to the present invention with one of rollers 30 in position therebetween. Bearing retainers 26 and 28 each comprise annular retainer ring 32 and a plurality of separator elements 34 that space rollers 30 circumferentially. Separator elements 34 are wedge-shaped with narrow portion 36 for engagement with a thrust flange, as described below, and an opposite wide portion 38 for engagement with rollers 30 to restrain the rollers in either the radially outward or radially inward direction. In the embodiment of FIG. 3, wide portion 38 limits radially inward movement of rollers 30.

Separator elements 34 are mounted on retainer ring 32 so as to be axially inward of retainer ring 32 and pivotally movable with respect to retainer ring 32. Any convenient type of pivotal mounting may be used with the invention. In the embodiment of FIG. 3, for example, separator elements 34 are mounted by metallic clips 40 and pins 42. Metallic clips 40 allow a predetermined amount of pivotal motion but prevent full rotation of separator elements 34. The pivotable mounting of the separator elements provides flexibility and reduces stress on the retainer ring, allowing a less massive structure to be used.

Figure 4:
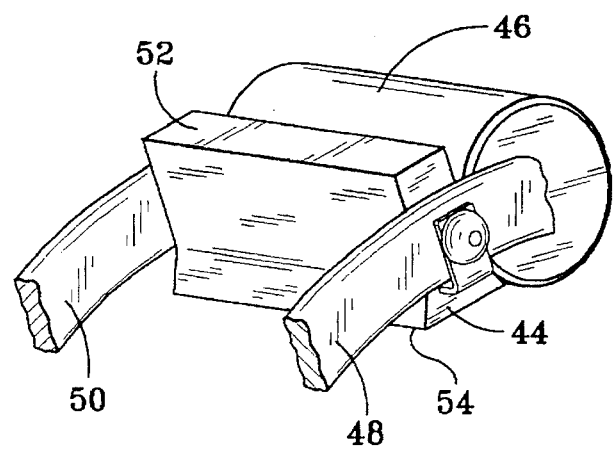
FIG. 4 is a pictorial view of a second embodiment of the bearing retainer according to the present invention.

FIG. 4 illustrates a second embodiment of the present invention having separator elements 44 extending the full axial length of rollers 46 and pivotally mounted on first retainer ring 48 and second retainer ring 50. Narrow portion 52 of separator elements 44 engages a thrust flange, as described below, and wide portion 54 engages rollers 46 to limit radial movement of the rollers in the radial direction. As with the first embodiment, separator elements 44 could be reversed, with wide portion 54 projecting radially outward, for roller bearings with either a flanged inner or flanged outer race.

Figure 5:
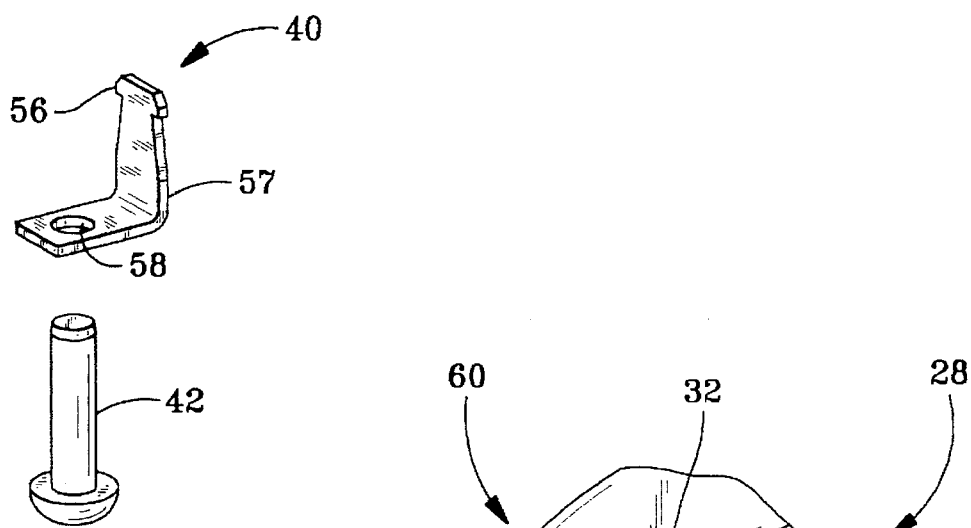
FIG. 5 is an enlarged pictorial view of a clip and rivet for use in the bearing retainers of FIGS. 1 through 4.

One form of metallic clip 40 is illustrated in FIG. 5. Metallic clip 40 may be formed as a simple stamping with barbed end 56 to be insert molded into a polymer composite or sintered product forming separator elements 34 and 44. Mid-portion 57 extends axially from separator elements 34 and 44 to engage the retainer ring and limit pivotal motion. The metallic clip/separator element subassembly may be attached by pin 42, a rivet, screw or other device, or by fitting a "U" type clip having an integral, formed tab or dimple, to engage locating hole 58, over the ring and into the insert.

Figure 6:
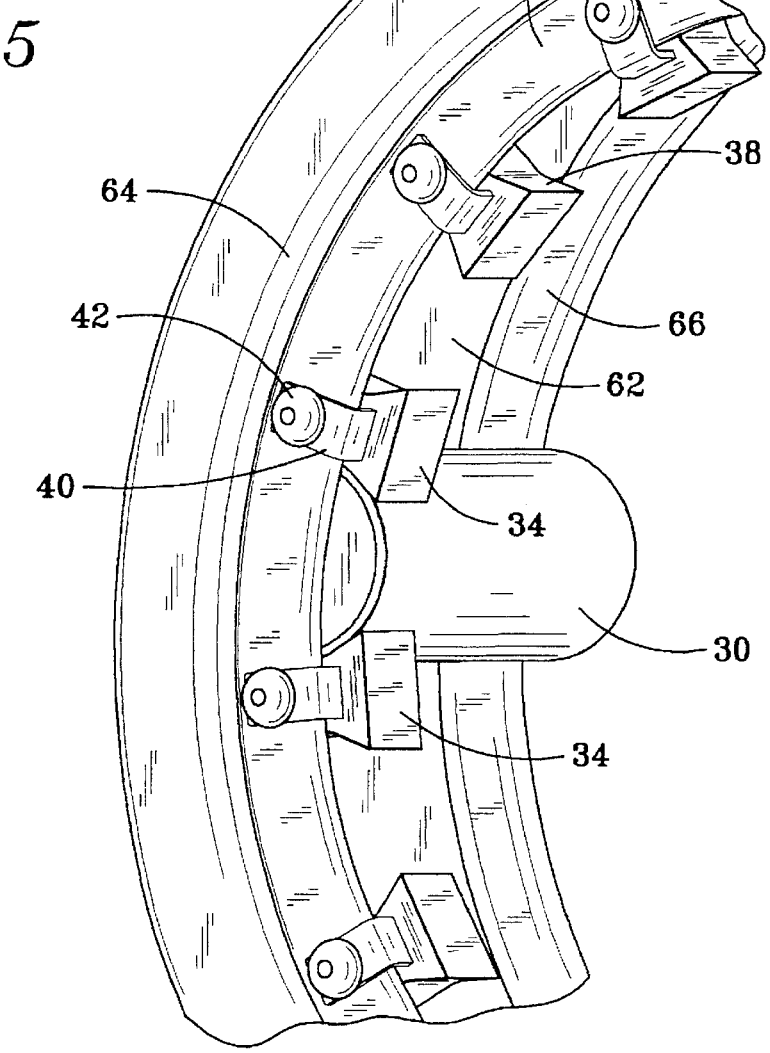
FIG. 6 is a pictorial view of the bearing retainer of FIG. 3 in combination with a roller and outer bearing ring.

FIG. 6 illustrates bearing retainer 28 of FIG. 3 in position against outer bearing ring 60 and with roller 30 in channel-shaped raceway 62. Axially outer thrust flange 64 and axially inner thrust flange 66 retain the rollers axially. Narrow portion 36 (shown in FIG. 3) of separator elements 34 engage axially outer thrust flange 64 to restrain axially outward movement of bearing retainer 28. Rollers 30 engage retainer ring 32 and restrain axially inward movement of bearing retainer 28.

Figure 7:
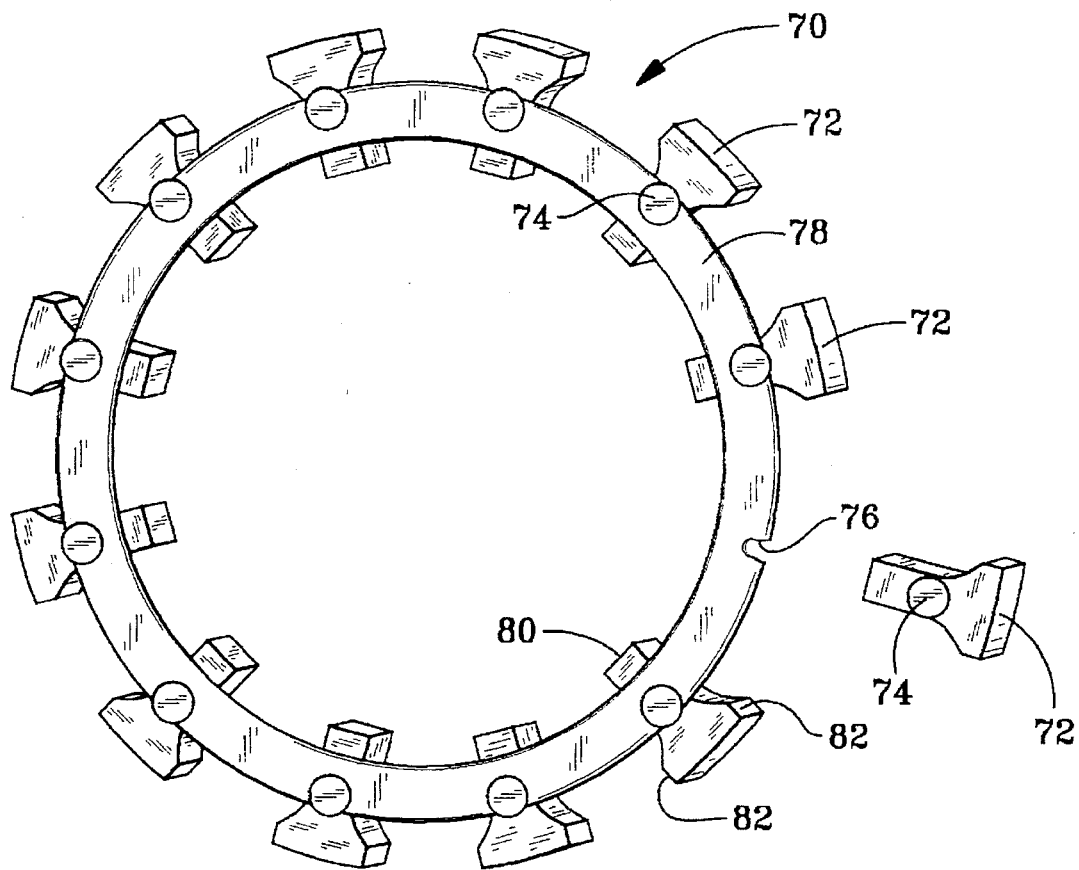
FIG. 7 is an exploded view of a third embodiment of the bearing retainer according to the present invention.

FIG. 7 illustrates bearing retainer 70 similar to the embodiments previously described but employing a snap-together assembly. Separator elements 72 have stud means 74 engageable with key hole-shaped slots 76 in the radially outward perimeter of retainer ring 78. In the embodiment illustrated, separator elements 72 have narrow portion 80 extending radially inward for engagement with a thrust flange of an inner bearing ring and have wide portion 82 extending radially outward to restrain radially outward movement of rollers, not shown. Other variations with the narrow and wide portions reversed or with key-hole shaped slots 72 in the radially inward perimeter of retainer ring 78 would be used for various roller bearing applications.

Figure 8:
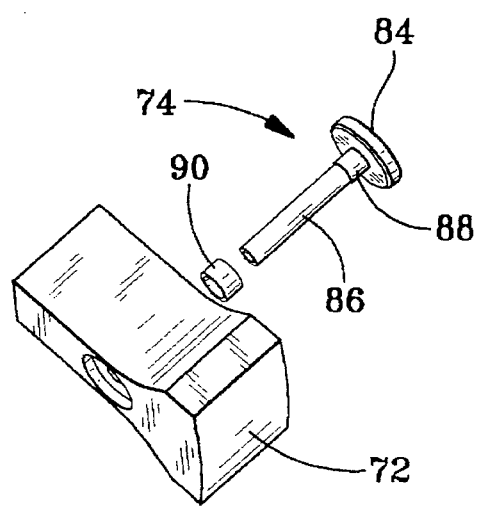
FIG. 8 is an exploded view of a separator element, stud and bushing for use in the bearing retainer of FIG. 7.

FIG. 8 illustrates a preferred construction of stud means 74. Head portion 84 engages retainer ring 78 to restrain axially outward movement of the retainer ring, pin portion 86 penetrates separator element 72, and raised shaft portion 88 spaces head portion 84 from separator element 72. Bushing 90 loosely overlies shaft portion 88 and is freely rotatatable with respect to shaft portion 88. Bushing 90 is resiliently deformable so as to collapse during insertion into the narrow opening of key hole-shaped slots 76 and reform itself to conform to the slots to enhance the snap-together assembly of bearing retainer 70. Pin 86 may be secured as a rivet or by various other means.

Figure 9:
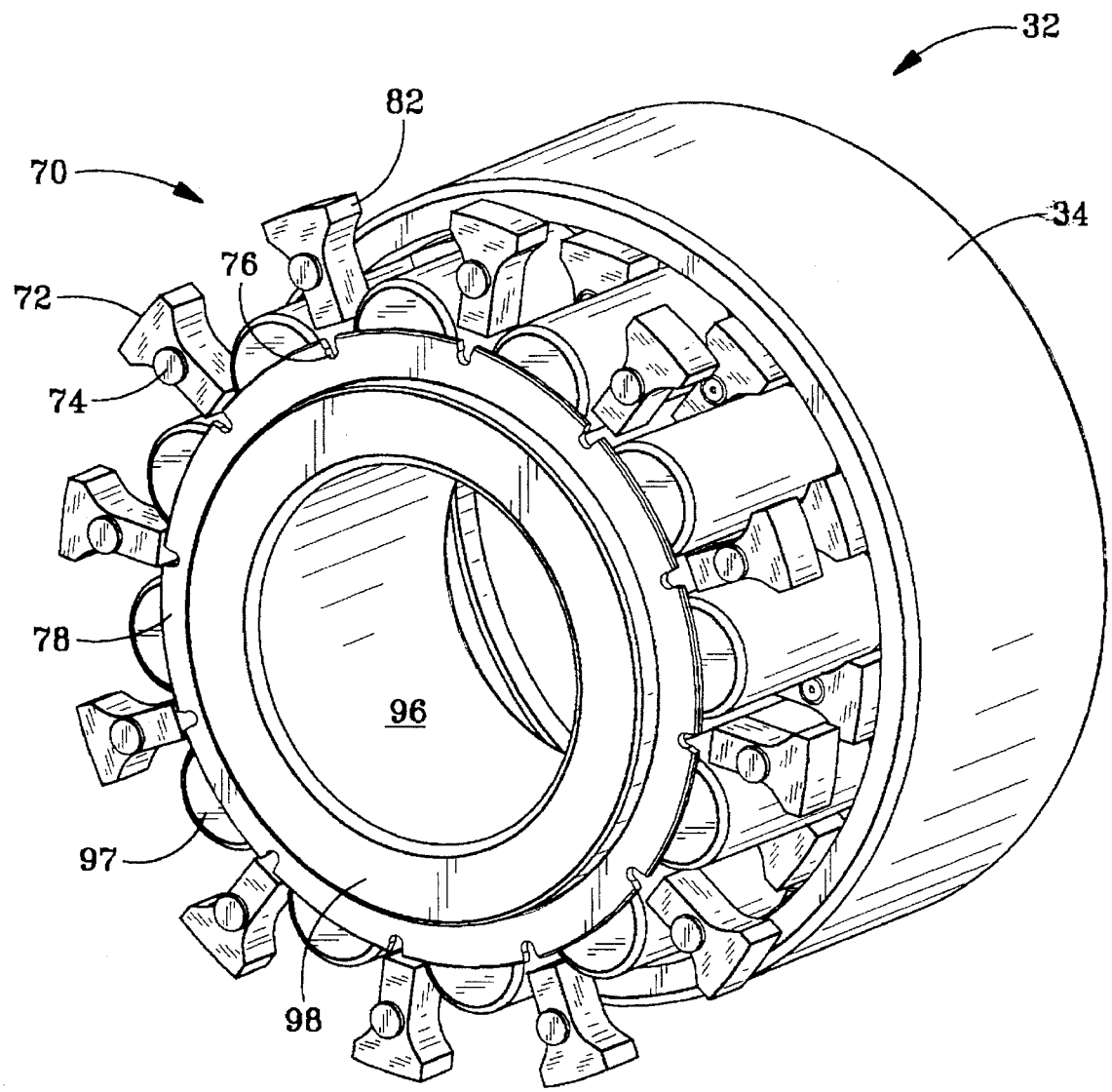
FIG. 9 is an exploded view of two bearing retainers of FIG. 7 in combination with a roller bearing.

In FIG. 9, an exploded view, two bearing retainers 70 are illustrated in combination with roller bearing 92 having outer bearing ring 94, inner bearing ring 96 and rollers 97. Inner bearing ring 96 has a channel-shaped inner raceway with thrust flanges 98 in engagement with narrow portions 80 of separator elements 72 to restrain bearing retainers 70 in the radially outward direction. Preferably, bearing retainers 70 are piloted by engagement of thrust flanges 98 by radially inner surfaces of retainer rings 78, thereby avoiding any wiping of lubricant from the inner raceway.

The present invention provides a modular assembly constructed from a pool of common components, or components requiring only minor geometry differences accomplished with inexpensive, adaptable tooling. Common components are used for a broad range roller bearings with various roller sizes, pitch and pitch diameter. Portions of the assembly are designed such that near net shape raw material may be used to achieve the geometry differences through adjustable or adaptive tooling. The bearing retainer of the present invention is low mass and provides improved space for lubricant with respect to prior art devices.

If the separator elements extend only a fraction of the roller length, two assemblies for each roller path are preferred, operating independently of each other, and can accommodate any length roller. One separator element extending the full length of the roller or two inserts connected through a bridging device, acting as one, would not have to extend beyond a thrust flange for retention in the axially outward direction. A simple wedge-shaped separator element configuration accommodates various roller diameters and moderate differences in circumferential spacing, adding increased versatility.

The diameter of the retainer ring would usually change with the pitch diameter of any given roller bearing; however, the material would be the same cross-section. By changing the spacing of the locating holes and the blank length, any desired ring could be formed from a common stock material. Various sequences may be used to facilitate assembly, depending on the type of roller bearing with which the invention is used. At least a portion of the separator elements may be attached to the retainer ring after the retainer ring and rollers are positioned within a channeled raceway.

The present invention allows several combinations of roller diameters, lengths, pitch and pitch diameter to be accommodated with a standard separator element subassembly and a retainer ring that are easily manufactured. Various sized separator elements, each accommodating several combinations of bearing parameters facilitates existing roller bearing configurations and permits satisfying new applications from a pool of standard components. The design is light in weight and leaves much of the roller bearing open to free circulation of lubrication.

Having described the invention, what is claimed is:

1. A bearing retainer for use with a roller bearing having rollers between an inner bearing ring and an outer bearing ring, the bearing retainer comprising:

an annular retainer ring to be positioned between the inner bearing ring and the outer bearing ring such that the retainer ring engages first ends of the rollers to limit axially inward movement of the bearing retainer; and a plurality of wedge-shaped separator elements pivotably mounted on the retainer ring such that the separator elements space the rollers circumferentially, the separator elements including a narrow portion for engagement with a thrust flange of one of the inner and outer bearing rings to restrain the bearing retainer in the axially outward direction and including a wide portion for engagement with the rollers to retain the rollers in one of the radially outward and radially inward directions.

2. The bearing retainer according to claim 1, wherein the separator element extends axially a distance less than half the axial length of the rollers.

3. The bearing retainer according to claim 1, wherein the separator element extends axially the full axial length of the rollers and wherein the bearing retainer further comprises an annular second retainer ring to be positioned between the inner bearing ring and the outer bearing ring such that the second retainer ring engages second ends of the rollers, at least some of the separator elements being pivotably connected to the second retainer ring.

4. The bearing retainer according to claim 1, wherein the narrow portions of the separator elements extend radially outwardly for engagement with a thrust flange of the outer bearing ring and wherein the wide portions of the separator elements extend radially inwardly to retain the rollers in the radially inward direction.

5. The bearing retainer according to claim 1, wherein the narrow portions of the separator elements extend radially inwardly for engagement with a thrust flange of the inner bearing ring and wherein the wide portions of the separator elements extend radially outwardly to retain the rollers in the radially outward direction.

6. The bearing retainer according to claim 1, wherein the wedge-shaped separator elements include clips extending axially from the wide portions of the separator elements and engageable with the retainer ring to limit pivotal motion of the separator elements with respect to the retainer ring.

7. The bearing retainer according to claim 6, wherein the clips include a radial portion axially outward of the retainer ring and wherein the separator elements are pivotably mounted by a shaft means between the radial portion and the separator elements and through the retainer ring.

8. The bearing retainer according to claim 7, wherein the retainer ring includes key hole-shaped slots engaging the stud means to provide a snap-together assembly of the separator elements onto the retainer ring.

9. The bearing retainer according to claim 8, wherein the slots of the retainer ring extend to a radial perimeter of the retainer ring.

10. The bearing retainer according to claim 8, wherein the slots of the retainer ring extend to a radially outward perimeter of the retainer ring such that the stud means is movable in a radially inward direction into the slots to provide the snap-together assembly of the retainer ring.

11. The bearing retainer according to claim 1, wherein the separator elements further comprise stud means extending into the retainer ring to provide the pivotable mounting of the separator elements.

12. The bearing retainer according to claim 11, wherein the stud means includes a head portion engageable with the retainer ring to restrain axially outward movement of the retainer ring, shaft means, and a bushing overlying the shaft means, the bushing being resiliently deformable during the snap-together assembly of the retainer ring.

13. A roller bearing assembly comprising:

a roller bearing retainer having rollers between an inner bearing ring and an outer bearing ring, one of the inner and outer bearing rings having a thrust flange;

an annular retainer ring between the inner bearing ring and the outer bearing ring and in engagement with first ends of the rollers to limit axially inward movement of the bearing retainer; and a plurality of wedge-shaped separator elements pivotably mounted on the retainer ring such that the separator elements space the rollers circumferentially, the separator elements including a narrow portion engaging the thrust flange to restrain the bearing retainer in the axially outward direction and including a wide portion in engagement with the rollers to retain the rollers in one of the radially outward and radially inward directions.

14. The roller bearing assembly according to claim 13, further comprising a second retainer ring pivotably mounted on the separator elements in engagement with second ends of the rollers.

15. The roller bearing assembly according to claim 13, wherein the separator elements extend less than one-half the axial length of the rollers and wherein the roller bearing assembly further comprises additional separator elements pivotably mounted on a second retainer ring, the additional separator elements engaging a second thrust flange on one of the inner and outer bearing rings and the second retainer ring engaging second ends of the rollers to limit axially inward movement of the second retainer ring.

16. The roller bearing assembly according to claim 13, wherein the separator elements are pivotably mounted on the retainer ring by a snap-together assembly.

* * * * *